United States Patent
Alla

(10) Patent No.: US 9,514,183 B1
(45) Date of Patent: Dec. 6, 2016

(54) INDEXING AND SEARCHING OF LARGE AMOUNTS OF MACHINE GENERATED DATA COLLECTED FROM DISPARATE SOURCES

(71) Applicant: eIQnetworks, Inc., Acton, MA (US)

(72) Inventor: Sridhar Alla, Carlisle, MA (US)

(73) Assignee: EiQ Networks, Inc., Boston, MA (US)

( * ) Notice: Subject to any disclaimer, the term of this patent is extended or adjusted under 35 U.S.C. 154(b) by 392 days.

(21) Appl. No.: 13/907,826

(22) Filed: May 31, 2013

Related U.S. Application Data

(60) Provisional application No. 61/654,567, filed on Jun. 1, 2012.

(51) Int. Cl.
*G06F 17/30* (2006.01)

(52) U.S. Cl.
CPC ... *G06F 17/30424* (2013.01); *G06F 17/30321* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 2007/0130137 A1* | 6/2007 | Oliver et al. | 707/5 |
| 2008/0028006 A1* | 1/2008 | Liu et al. | 707/204 |
| 2009/0248712 A1* | 10/2009 | Yuan | 707/100 |
| 2011/0320458 A1* | 12/2011 | Karana | 707/741 |
| 2013/0103657 A1* | 4/2013 | Ikawa et al. | 707/693 |

* cited by examiner

*Primary Examiner* — Thu Nga Nguyen
(74) *Attorney, Agent, or Firm* — Patent GC, LLC

(57) ABSTRACT

A computer-implemented method of searching large amounts of machine generated data collected from disparate sources, comprises steps of: receiving data from the disparate sources into a multi-level system of storage blocks; high-speed searching at a broad level for groups of the storage blocks containing records of interest; nested searching at an intermediate level to determine specific storage blocks containing the records of interest, within the groups of the storage blocks; distributed searching at a fine level to identify the records of interest, within the specific storage blocks; and displaying the records of interest to a user. In a computer data storage device, a data structure comprises: plural data files each holding a data group from a large data set, wherein the data groups are permitted to contain overlapping data; and plural index trees within each data file, each index tree representing a key into a data group; wherein an absence of a key in one data file results in an absence of a corresponding index tree in the one data file. A computer storage medium has stored thereon instructions for a computer to perform the method described above.

8 Claims, 10 Drawing Sheets

Distributed Indexing: ③

3)

4)

sip.records file is appended to sip.records_Agent1 the recno is adjusted while appending.

Since sip.records is appended, sip.indextree file position pointers are modified while updating/merging the Agent's Temp Index into main Index Repeat for user.index, dip.index....

INDEXING AND SEARCHING OF LARGE AMOUNTS OF MACHINE GENERATED DATA COLLECTED FROM DISPARATE SOURCES

BACKGROUND

The present invention relates to information retrieval methods on large scale machine generated data (both structured and unstructured data), and more particularly to indexing and searching large amounts of machine generated data collected from disparate sources.

In general, computer security (or cyber security) is the process of preventing and detecting unauthorized use of a computer. Prevention measures help one stop unauthorized users (also known as "intruders") from accessing any part of a computer system. Detection helps one to determine whether or not someone attempted to break into a system, if they were successful, and what they may have done.

Intruders (also referred to as hackers, attackers, or crackers) may not care about one's identity. Often they want to gain control of a computer so they can use it to launch attacks on other computer systems.

After taking control, the hackers can hide their true location as they launch attacks, often against high-profile computer system, such as government or financial systems. Even if one has a computer connected to the Internet only to play the latest games or to send email to friends and family, the computer may be a target.

Intruders may be able to watch all one's actions on the computer, or cause damage to the computer by reformatting a hard drive or changing data.

Unfortunately, intruders are always discovering new vulnerabilities (informally called "holes") to exploit in computer software. The complexity of software makes it increasingly difficult to thoroughly test the security of computer systems.

BRIEF SUMMARY

This summary is not an extensive overview of the invention. It is intended to neither identify key nor critical elements of the invention nor delineate the scope of the invention. Its sole purpose is to present some concepts of the invention in a simplified form as a prelude to the more detailed description that is presented later.

A method and system are provided to index and search large amounts of machine generated data. Typical information retrieval algorithms focus on indexing and searching of document text using various algorithms to build index and then allowing the searching of all the indexed documents for any queried text. When processing machine generated data, emphasis is put on timestamp and specific fields like username, IP Address, security related actions amongst other fields rather than the textual context which is the primary mode of operation of document indexing models.

The present invention provides a system and method to perform analysis on large amounts of disparate data from disparate sources using storage, search, correlation and retrieval algorithms. More specifically, indexing and information retrieval algorithms provide an ability to effectively collect, store, search, retrieve, cross-correlate and display in time sequenced manner large number of data records from disparate data sources.

According to aspects of an embodiment, a computer-implemented method of searching large amounts of machine generated data collected from disparate sources, comprises steps of: receiving data from the disparate sources into a multi-level system of storage blocks; high-speed searching at a broad level for groups of the storage blocks containing records of interest; nested searching at an intermediate level to determine specific storage blocks containing the records of interest, within the groups of the storage blocks; distributed searching at a fine level to identify the records of interest, within the specific storage blocks; and displaying the records of interest to a user. In a variation, high-speed searching further comprises: applying a first search criterion by which a distribution of the records of interest amongst the groups of storage blocks is identified. In a further variation, nested searching further comprises: creating and adjusting a time range filter to include in the specific storage blocks, only those storage blocks covering a time range when the records of interest are created. In another variation, displaying further comprises: arranging the records of interest in time sequence. In yet another variation, the method further comprises indexing the data received using plural index databases corresponding to plural keys into the data received; and managing each index database as a separate index tree. In a further variation, the method further comprises grouping the data received into sets defined by time periods; and performing indexing and managing within one set separately from within another set, so the one set can be separately searched from the another set. The method may yet further comprise: indexing on any field within the data received; adding to one of the plural index databases a new field when found in the data received; and removing from one of the plural index databases a filed no longer used in the data received.

According to aspects of another embodiment, in a computer data storage device, a data structure comprises: plural data files each holding a data group from a large data set, wherein the data groups are permitted to contain overlapping data; and plural index trees within each data file, each index tree representing a key into a data group; wherein an absence of a key in one data file results in an absence of a corresponding index tree in the one data file.

According to aspects of yet another embodiment, a computer storage medium on which are stored instructions for a computer to perform a method of searching large amounts of machine generated data collected from disparate sources, comprising steps of: receiving data from the disparate sources into a multi-level system of storage blocks; high-speed searching at a broad level for groups of the storage blocks containing records of interest; nested searching at an intermediate level to determine specific storage blocks containing the records of interest, within the groups of the storage blocks; distributed searching at a fine level to identify the records of interest, within the specific storage blocks; and displaying the records of interest to a user. Variations as described above in connection with method embodiments may also be combined variously with this computer storage medium embodiment.

Other features and advantages of the invention are evident from the following descriptions and drawings.

BRIEF DESCRIPTION OF THE FIGURES

The invention will be more fully understood by reference to the detailed description, in conjunction with the following figures, wherein.

DESCRIPTION

The subject innovation is now described with reference to the drawings. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Figure 1:
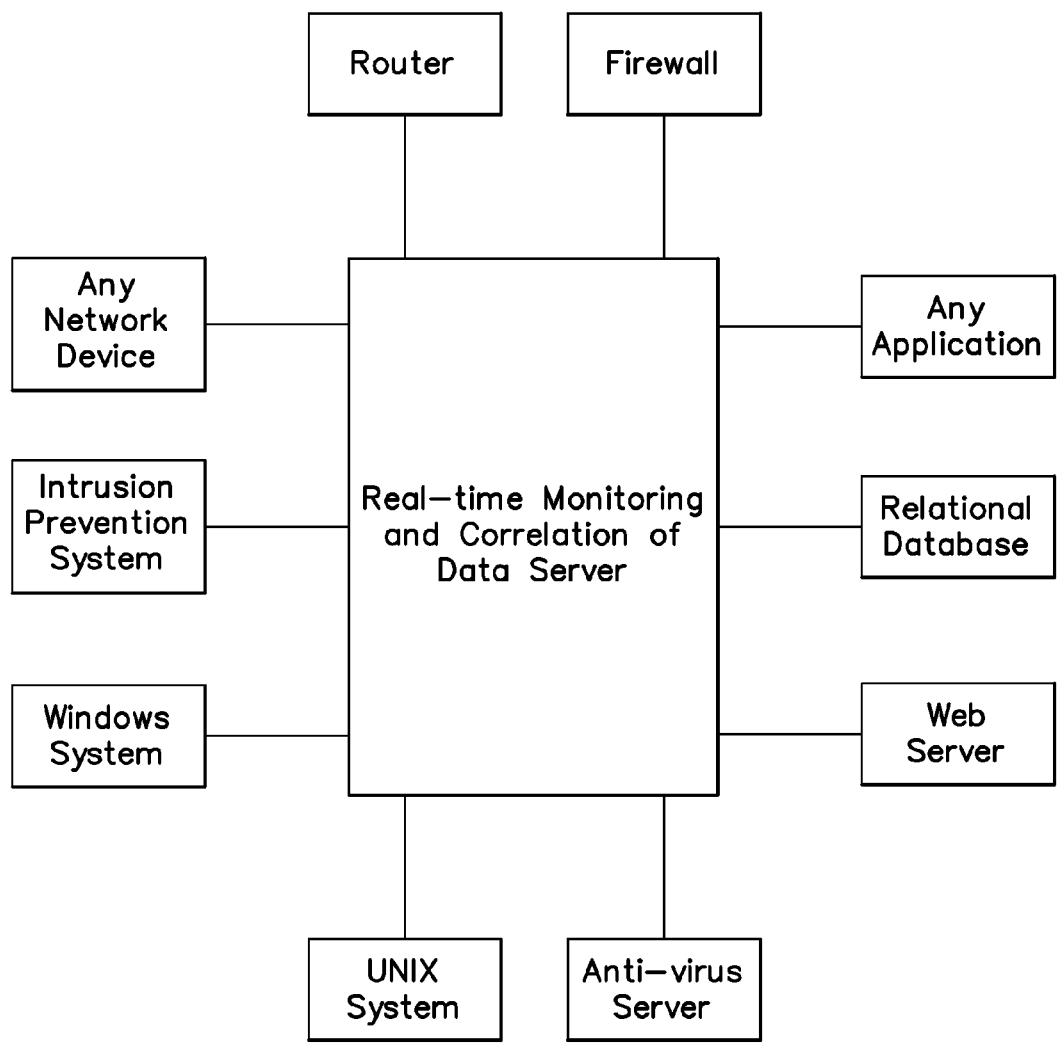
FIG. 1 is a block diagram.

As shown in FIG. 1, an exemplary network includes one or more information technology (IT) assets, such as a firewall, a router, an intrusion detection system (IDS), intrusion protection system (IPS), a Windows system, a UNIX system, a Linux system, and so forth, and applications such as email, relational databases, web servers, ISA and Anti-virus server, and so forth. Each of these IT assets is linked to a real-time monitoring and correlation of data server.

The real-time monitoring and correlation of data includes a processor and a memory. The memory includes an operation system and a process for analysis on large amounts of disparate data from disparate sources.

Cyber security is becoming a part of every organization's infrastructure and has evolved from a simple system log that logged user activity to a complex ecosystem of security tools, devices and products. The data is not simply from desktops and servers, but, as shown in FIG. 1, now includes a variety of technologies used for identity management, networking, web access gateways, mobile applications, wireless technologies, enterprise specific applications, and so forth. With such a wide variety of seemingly disparate data sources, it is a monumentally complex task to archive large amounts of disparate security, compliance and policy data and search through 100s of terabytes (TBs) of data to analyze the security and compliance posture of an organization.

The process for analysis on large amounts of disparate data from disparate sources provides the ability to effectively store/manage/search large volumes of disparate data (e.g., log/events, connectivity state, flow data, asset data, asset criticality, policy data, compliance data, File Integrity Monitoring (FIM), user data, and so forth) from different IT assets, such as devices, hosts, applications, and so forth. The process enables extremely efficient and fast search of optimally indexed data at extremely high speeds, correlation of the disparate data types, and display of the search results in time sequenced manner irrespective of data type (e.g., logs/events, asset changes, configuration changes, policy violations, flow data, and so forth). This significantly reduces the time to understand the root cause of the problem. While dealing with such large volumes of data, retrieving the accurate data fast might mean the difference between severe data loss and prevention of the data loss before it even occurs. It is also desirable to understand policy violations, usage patterns, user behavior, identify external and insider attacks, cyber attacks, and so forth.

The process for analysis on large amounts of disparate data from disparate sources enables universal data support, i.e., it supports several index databases. Each data set is managed by a different Index tree. For example, a default index tree deals with OLF6 data, a binary index tree deals with packet data, such as flow events, and a custom index tree deals with user defined formats.

The process for analysis on large amounts of disparate data from disparate sources enables any field within the data can be indexed. New fields originating from the data can also be indexed and existing fields can be removed from indexing at any instance. Old data can also be indexed for the new fields. Using extensible indexing, a user can add new ways of extracting data from any data source and then index the same into the database for later usage.

The process for analysis on large amounts of disparate data from disparate sources maintains data in .gz2 files as blocks for speedy retrieval, thus enabling flexibility to access any particular event with the help of block number and retrieve the data faster. And by distributing the indexes across different levels such as DAILY, MONTHLY, YEARLY and GLOBAL, actual data is identified in the first glance, thereby eliminating unnecessary processing time.

Figure 3:
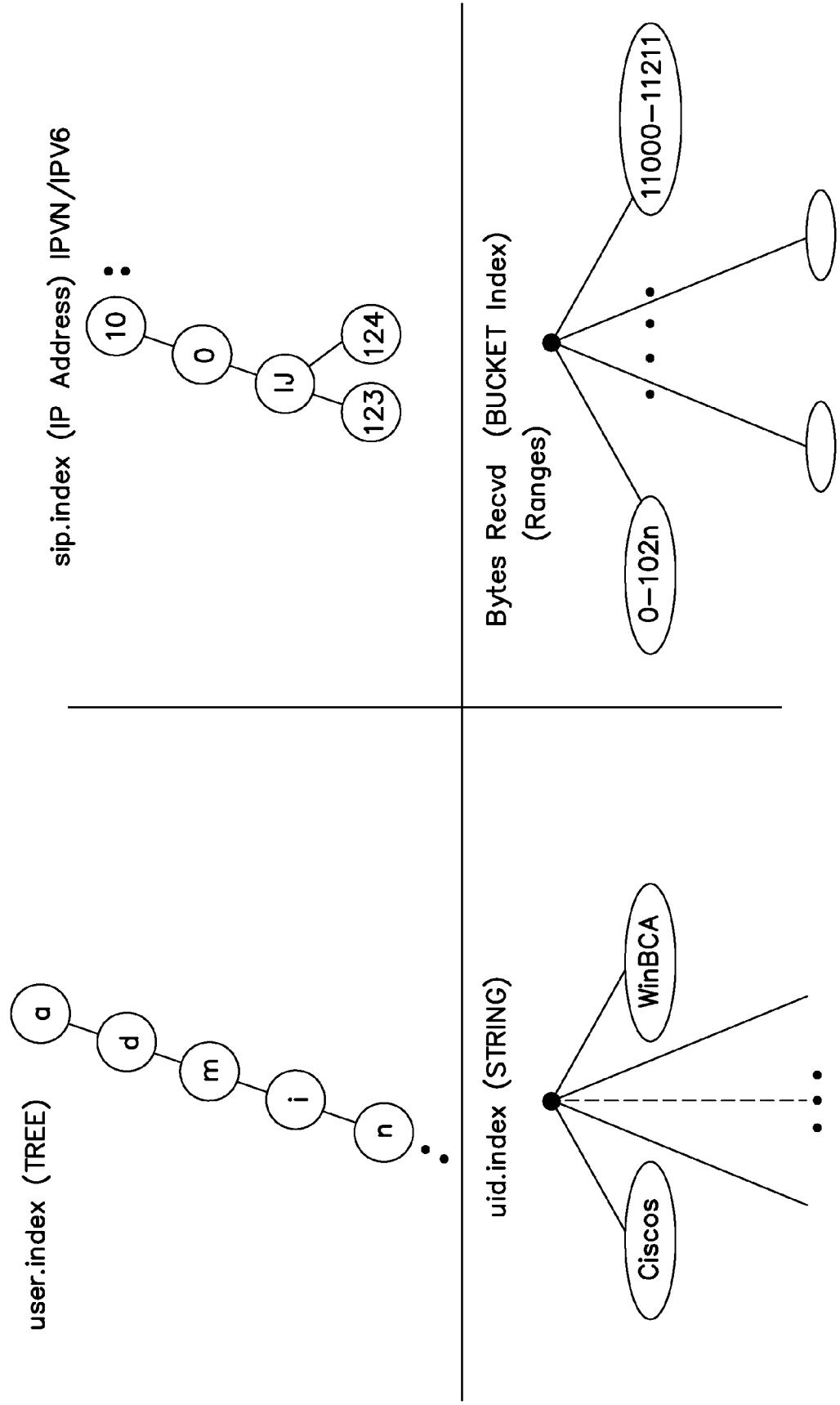
FIG. 3 shows sample indexing.
Figure 4:
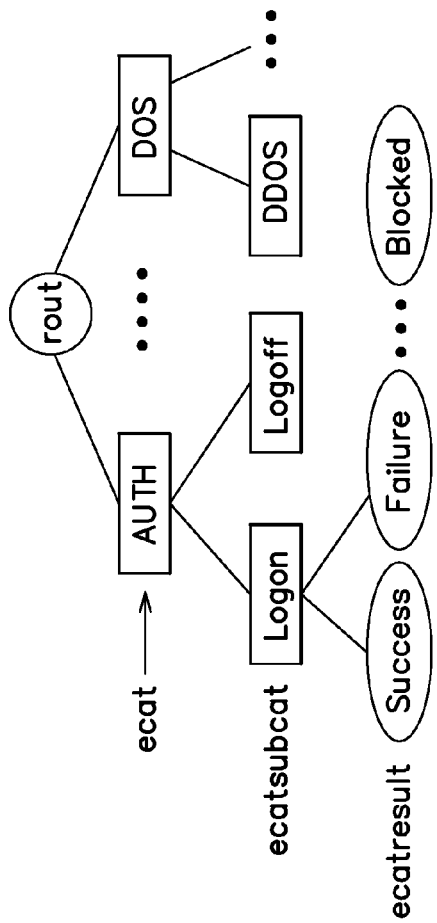
FIG. 4 shows sample indexing.
Figure 4:
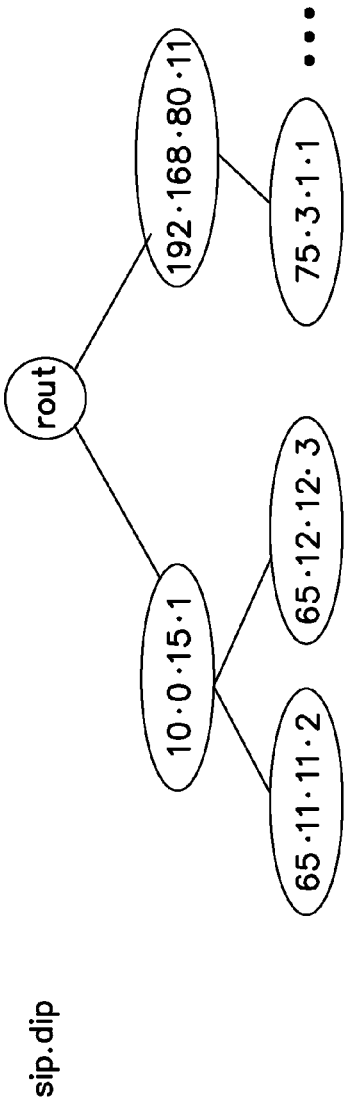

As shown in FIG. 3 and FIG. 4, indexing involves several types of indexing depending on the expected functionality and also performance aspects.

If a username is seen for a security related event, such as a failed logon attempt to a windows Domain Controller is to be indexed, the username has to be indexed into the database to enable the search of all the events which are related to that specific username at a later time.

Figure 5:
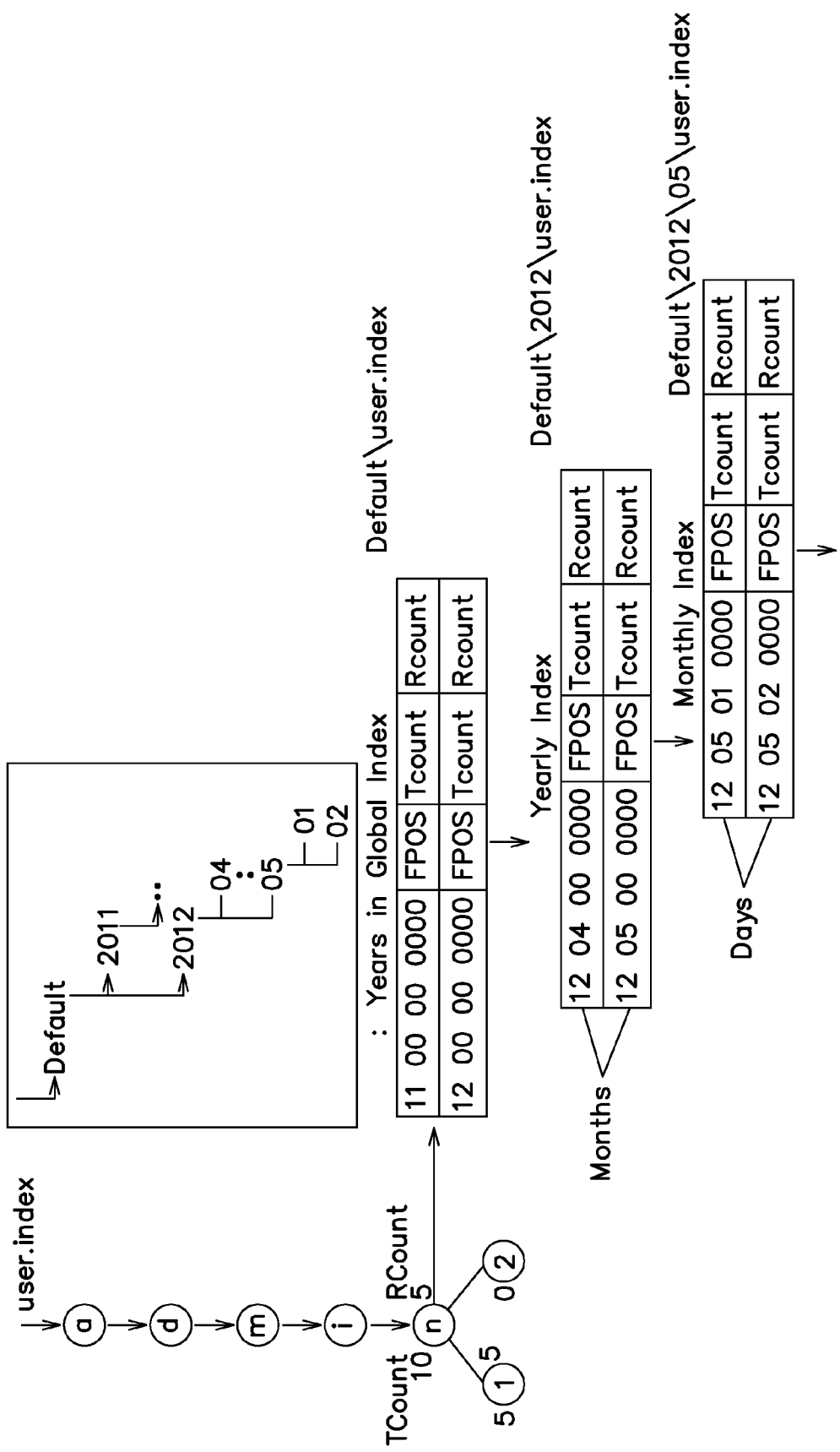
FIGS. 5-10 illustrate exemplary data structures.
Figure 6:
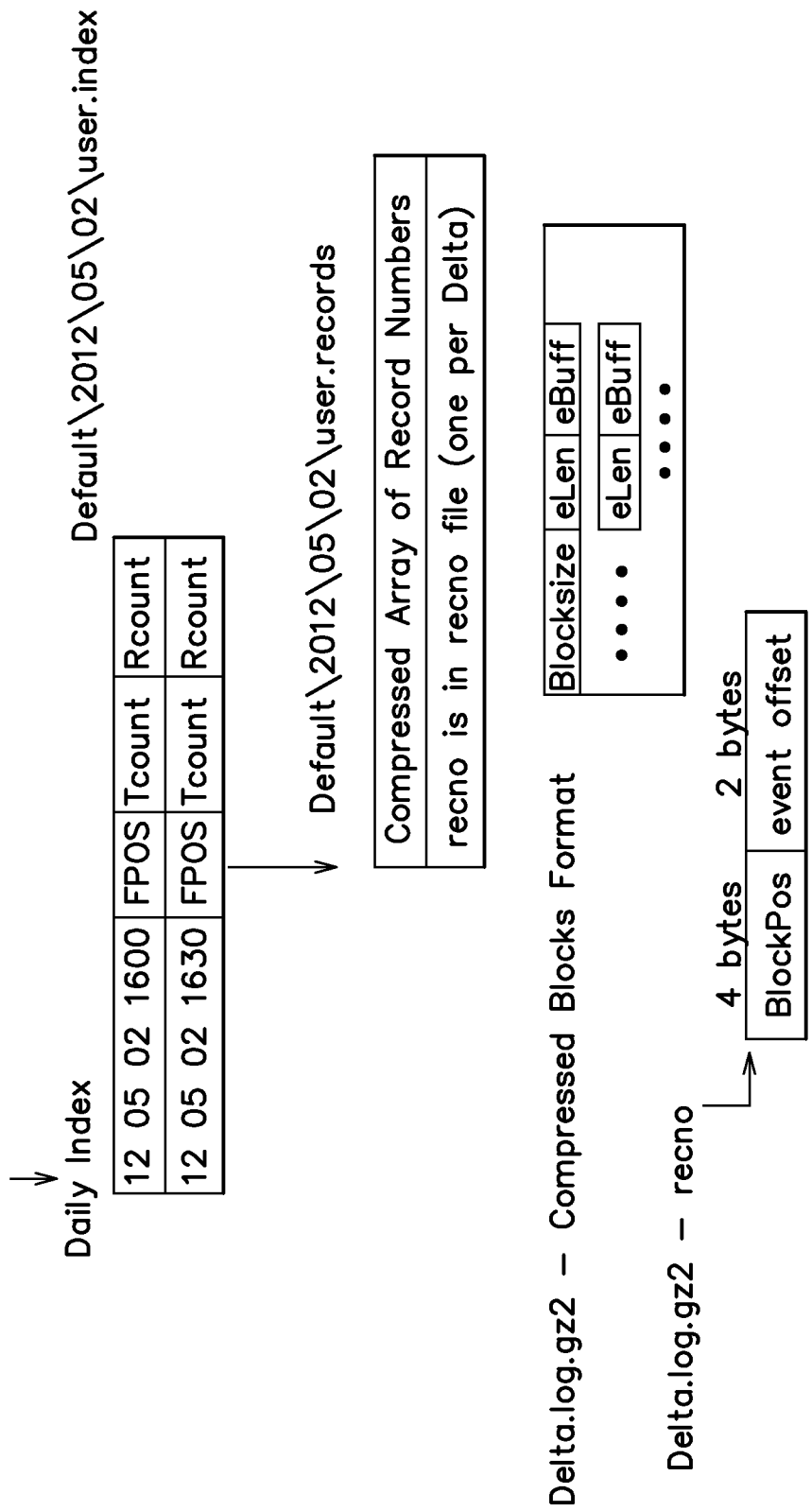

A first step is to illustrate the tree data structure which stores the username and how each username stores the total and record counts at each level as shown in FIG. 5 and FIG. 6.

Using a specific example of how admin is represented in the tree and how admin1 and others like administrator are represented, we can understand the tree data structure, labeling the nodes and writing exact variables stored at each level represented again by another user.index file.

An index for a field is represented as:
Global→Years→Months→Days
[YYmmDDHHMM|filepos|totalcount|recordcount]

Next, the IndexRecord data structure is shown in FIG. 5 as containing YYMMDDHHmm, where YY is the last 2-digits of the year-13, MM is 01-12, DD is 01-31, HH is 00-23 and mm is 00 or 30 (representing a half hour). The IndexRecord data structure also contains the file position to the next level, the total count and record count variables.

Using this the entire path is shown in FIG. 5 and FIG. 6, where a global index record points to Yearly Index records which look like 1200000000 (representing 2012). Then we use the file position to get the individual months like 1204000000 and 1205000000. After this the monthly data structure can be accessed to get to the list of all individual days 1205010000 and 1205020000. Then each day has a list of all thirty (30) minute periods during which the username admin occurred. Once the 30 minute (half hour) record is reached, then the filepos points to user.records file as this is the final level.

The FIG. 6 also shows the internal structure of the delta file which is the time sequenced collection of all machine generated data. This allows range queries on time as well as using the multiple secondary indexes on the data. Each file of form Delta1630.log.gz2 has a corresponding record file which stores the block pos+offset for each record. Using the record number, the record number file is readily identified, and the block offset and the record offset are applied to extract the exact record from the indexed database.

Thus, considering the user.records file within a day 2012/05/02, the corresponding user.index entries point to individual 30 minute chunks of form HHMM and each index record points to an individual 30 minute also points to the exact location inside the user.records where a compressed list of the exact record numbers is found.

Once the list of exact record number is found, we lookup the corresponding 30 minute delta file's corresponding record number file and grab the block+offset combinations. These are then used to seek into the compressed encrypted file Delta1630.log.gz2 and extract the block followed by extraction of the actual record of data we were looking for.

Figure 8:
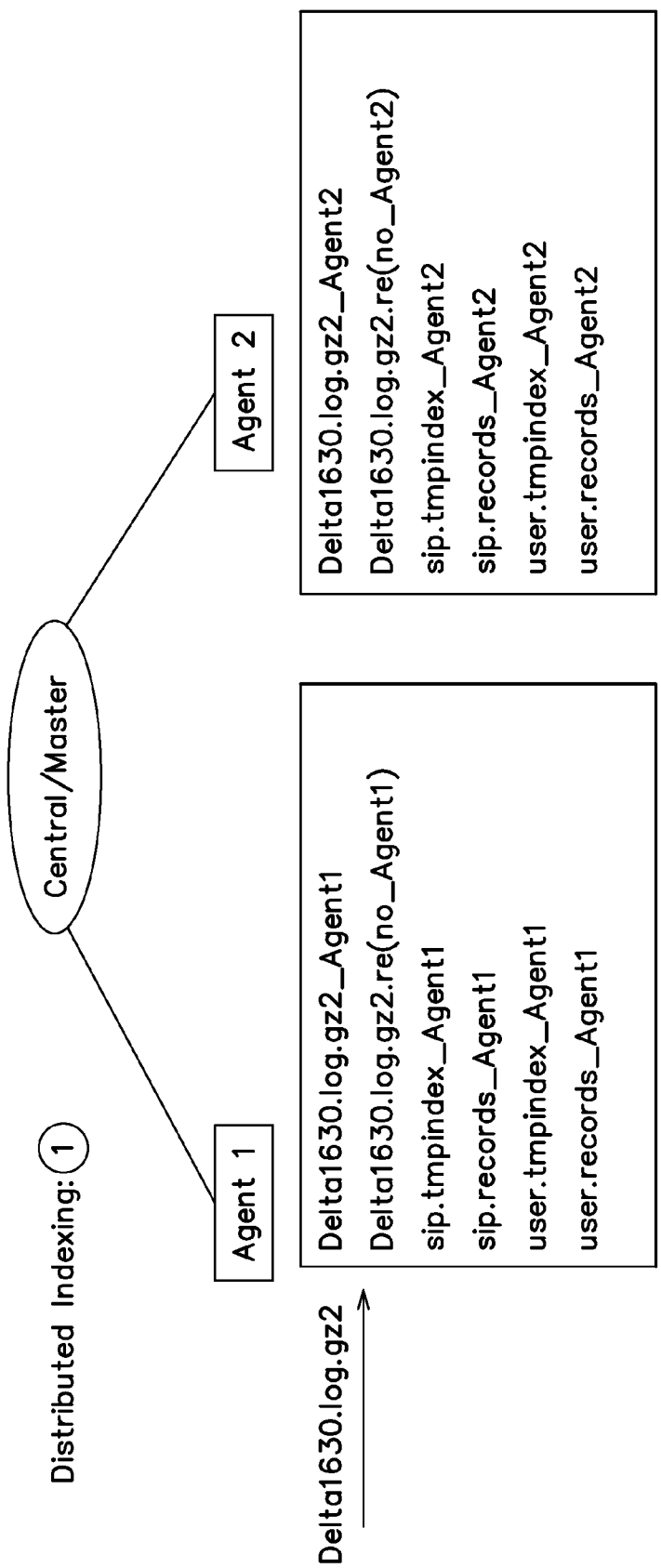
Figure 9:
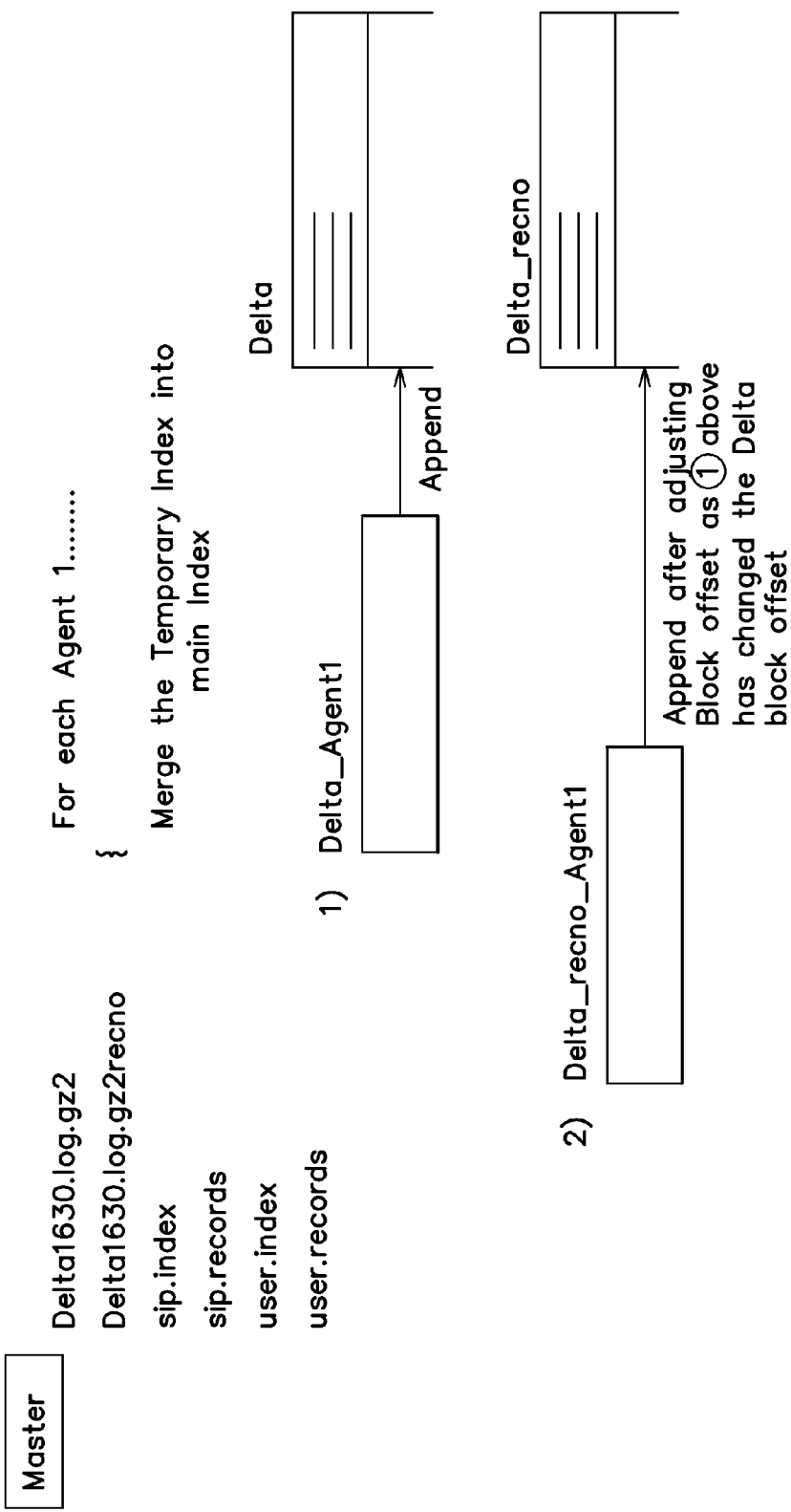
Figure 10:
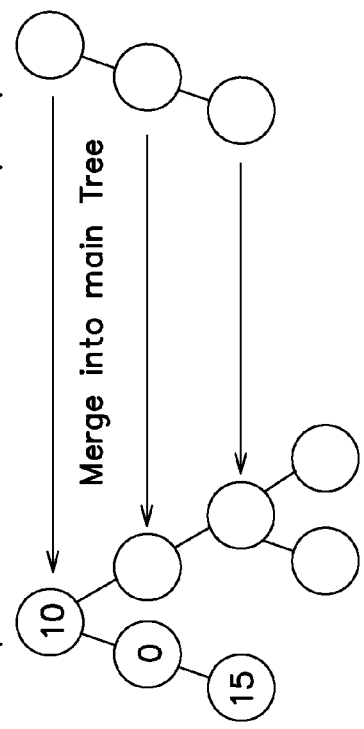
Figure 10:
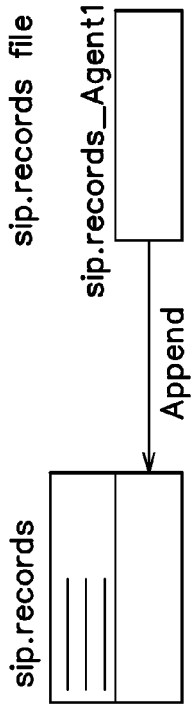

FIG. 8, FIG. 9 and FIG. 10 illustrate distributed indexing algorithms. In distributed indexing, we have the master and the agent components that all work together to perform indexing and searching.

If Agent1 and Agent2 are the two workers, then after each one processed their own deltas they will have Delta1630.log.gz2 and corresponding record files even though they both have the same interval. Also they each create a temporary user.index file and user.records file.

So both agents create the delta file and record number file and then the index+records files for each field indexed.

The master is responsible for merging and updating the main index from the individual agent index files. It processes by first merging the Delta.log.gz2 file and then appends the record number file by compensating for the changed (modified) starting block position when second agent's temporary index is being merged.

Each agent's temporary index is merged entirely before second agent's temporary index is merged into the main index.

FIG. 8, FIG. 9 and FIG. 10 also illustrate how user.index is loaded in memory and the agent's temporary index is merged into the main user.index tree data structure while also updating user.records adjusting the change in record number.

If Agents lists record numbers 1-10 and main index has likewise, while updating the record numbers are changed by adding the offset of 10 to make the agent's effective index record numbers as 11 and upwards.

While merging the trees between main and agent temporary index, this is also taken into account as even the file position where user.index points to inside user.records file also changes as we are appending the main user.records file with the agent's user.records file.

We repeat the same process for the second agent, third and so on. Thus all indexed fields are indexed in a distributed manner.

As shown in FIG. 10, to search using the distributed search, we break down the search process into two phases. If three agents are used for a 12 month search, each agent is assigned four months and a master gets the record distributions from each agent as each agent evaluates the same search expression for the portion of time it is assigned. This is phase 1.

At this point we only have counts and not the actual records which is done in phase 2. A reason for a second phase is that we have a fair distribution of workload which is doing a lot of disk I/O operations and extracting the actual data records once the array of record numbers is given.

After phase 1, the master appends the distributions and then redoes the split, this time according to the event counts so even though each agent gets fours months in phase 1, this changes to something like six months, four months and two months, depending on the time period which approximately divides the total search interval into equal parts.

Phase 2 is executed on each agent where the actual data records are fetched from the database and written as search results.

Central or master is responsible for merging all the agent specific temporary results into the results file sorted by time sequence irrespective of all the data from disparate data sources.

Figure 2:
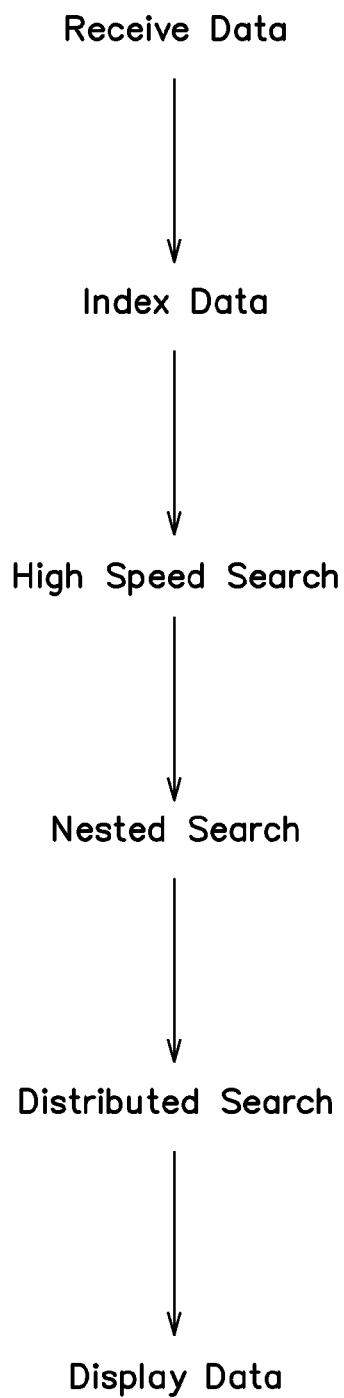
FIG. 2 is a flow diagram.

As shown in FIG. 2, the process for analysis on large amounts of disparate data from disparate sources includes a high speed search. A first stage search gets only the events distribution summary as per search criteria. In this stage, the index tree is processed and the results in the form of a are count provided to the user instantaneously. .gz2 files (actual events) are not processed at this stage, so the search is fast and displays the result counts almost immediately. Before a second stage is started, the process makes use of first stage results to adjust the time range filter to process the time range where actual events available for this given criteria. By doing this, the process can save time in processing the actual interested time range where the data is available.

Figure 7:
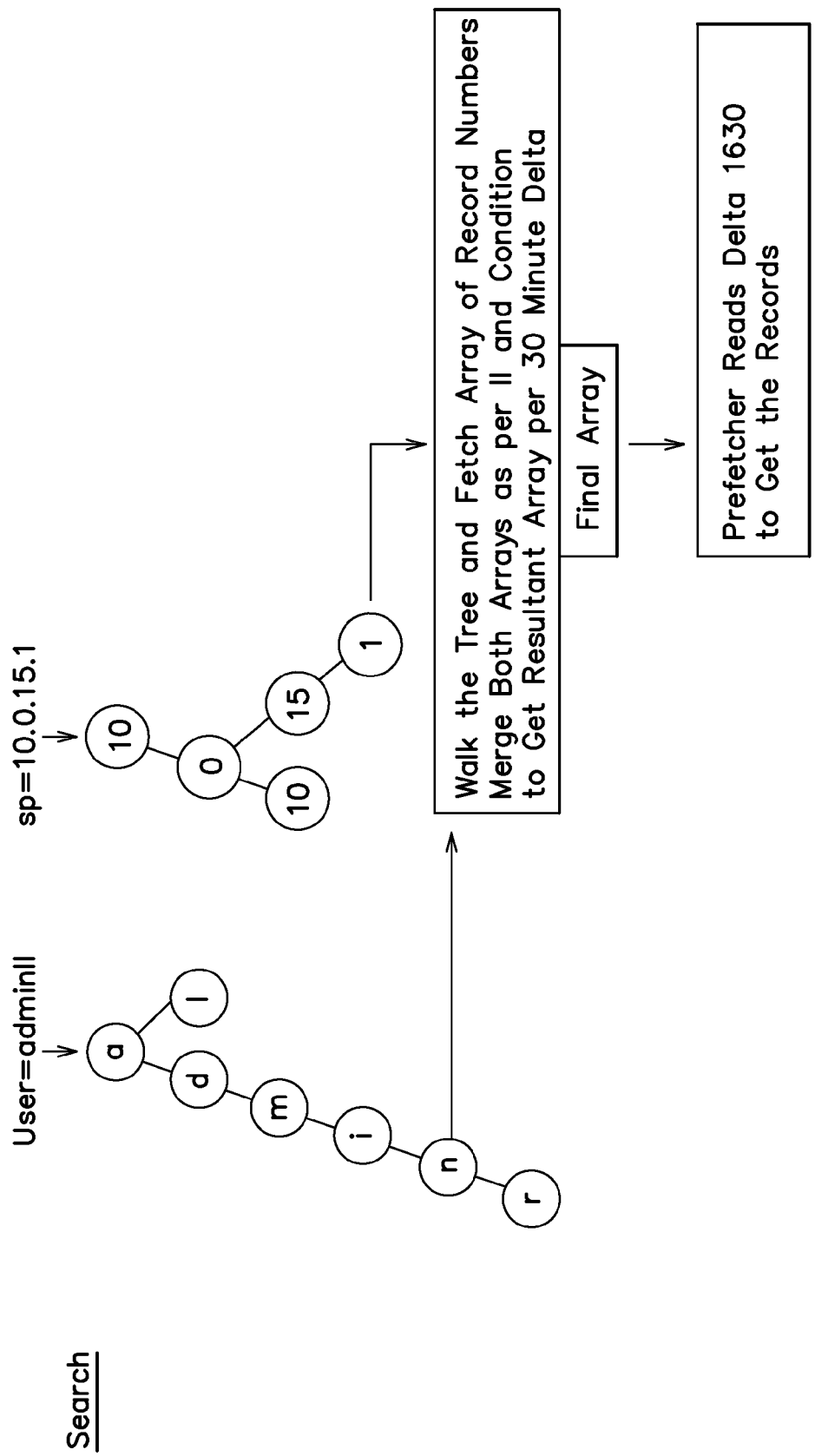

FIG. 7 shows how a search filter expression is evaluated by individually loading the index tree per field appearing in the expression and then constructing the "exact record number" arrays for each individual filter. For example, Sip=10.*&& user=admin means both arrays should be merged as the condition that record number appears in both arrays. If its OR condition the record number can be in either array. NOT condition means we take all records from the 30 minute delta and exclude the record numbers.

In the end at each level of the filter of form ((a AND b) OR (c AND d)) the record number arrays are constructed and the AND/OR/NOT operations are applied incrementally building the array and trimming the array.

Once the final array is constructed, then each record number is used to get the block+offset numbers from the corresponding record number files for each 30 minute interval and each such record is fetched from the data record delta to get the actual data record and displaying it on screen.

The process for analysis on large amounts of disparate data from disparate sources includes a nested search. This is also known as an iterative search which helps in digging the particular situation in a single step. Multiple searches can be performed with single instruction and make use of one search result in another search as input.

The process for analysis on large amounts of disparate data from disparate sources includes a distributed search. Real load balancing is done in highly intelligent manner. First, the process identifies the time slots where data available as per given search criteria then distribute the search task to different agents to process the almost equal number of events.

Extension DLLs gives the flexibility to change/support the behavior as per user requirements. This can be done at every stage that uses this indexing feature, like while parsing the events, indexing the events, displaying the results. They can also be used for notifications.

Block level compression and AES 192-bit FIPS compliant encryption ensures integrity of the data.

Using multi-key indexing, multiple fields can be grouped together as part of index.

Data results are correlated and time-sequenced for display.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A computer-implemented method of searching large amounts of machine generated data collected from disparate sources, comprising steps of:
   receiving data from the disparate sources into a multi-level system of storage blocks;
   high-speed searching at a broad level for groups of the storage blocks containing records of interest;
   nested searching at an intermediate level in which the multi-level system of storage blocks are iteratively searched to determine specific storage blocks containing the records of interest, within the groups of the storage blocks;
   distributed searching in which searching resources are load balanced among the specific storage blocks at a fine level to identify the records of interest, within the specific storage blocks; and
   indexing the data received using plural index databases corresponding to plural keys into the data received;
   managing each index database as a separate index tree;
   grouping the data received into sets defined by time periods; and
   performing indexing and managing within one set separately from within another set, so the one set can be separately searched from the another set;
   indexing on any field within the data received;
   adding to one of the plural index databases a new field when found in the data received; and
   removing from one of the plural index databases a filed no longer used in the data received;
   displaying the records of interest to a user.

2. The method of claim 1, wherein high-speed searching further comprises:
   applying a first search criterion by which a distribution of the records of interest amongst the groups of storage blocks is identified.

3. The method of claim 2, wherein nested searching further comprises:
   creating and adjusting a time range filter to include in the specific storage blocks, only those storage blocks covering a time range when the records of interest are created.

4. The method of claim 1, wherein displaying further comprises:
   arranging the records of interest in time sequence.

5. A non-transitory computer storage medium on which are stored instructions for a computer to perform a method of searching large amounts of machine generated data collected from disparate sources, comprising steps of:
   receiving data from the disparate sources into a multi-level system of storage blocks;
   high-speed searching at a broad level for groups of the storage blocks containing records of interest;
   nested searching at an intermediate level in which the multi-level system of storage blocks are iteratively searched to determine specific storage blocks containing the records of interest, within the groups of the storage blocks;
   distributed searching in which searching resources are load balanced among the specific storage blocks at a fine level to identify the records of interest, within the specific storage blocks; and
   indexing the data received using plural index databases corresponding to plural keys into the data received;
   managing each index database as a separate index tree;
   grouping the data received into sets defined by time periods; and
   performing indexing and managing within one set separately from within another set, so the one set can be separately searched from the another set;
   indexing on any field within the data received;
   adding to one of the plural index databases a new field when found in the data received; and
   removing from one of the plural index databases a filed no longer used in the data received;
   displaying the records of interest to a user.

6. The storage medium of claim 5, wherein high-speed searching further comprises:
   applying a first search criterion by which a distribution of the records of interest amongst the groups of storage blocks is identified.

7. The storage medium of claim 6, wherein nested searching further comprises:
   creating and adjusting a time range filter to include in the specific storage blocks, only those storage blocks covering a time range when the records of interest are created.

8. The storage medium of claim 5, wherein displaying further comprises:
   arranging the records of interest in time sequence.

* * * * *